July 8, 1958 — H. S. GREEN ET AL — 2,842,325
RETRACTABLE LANDING GEAR
Filed Jan. 11, 1956 — 3 Sheets-Sheet 1
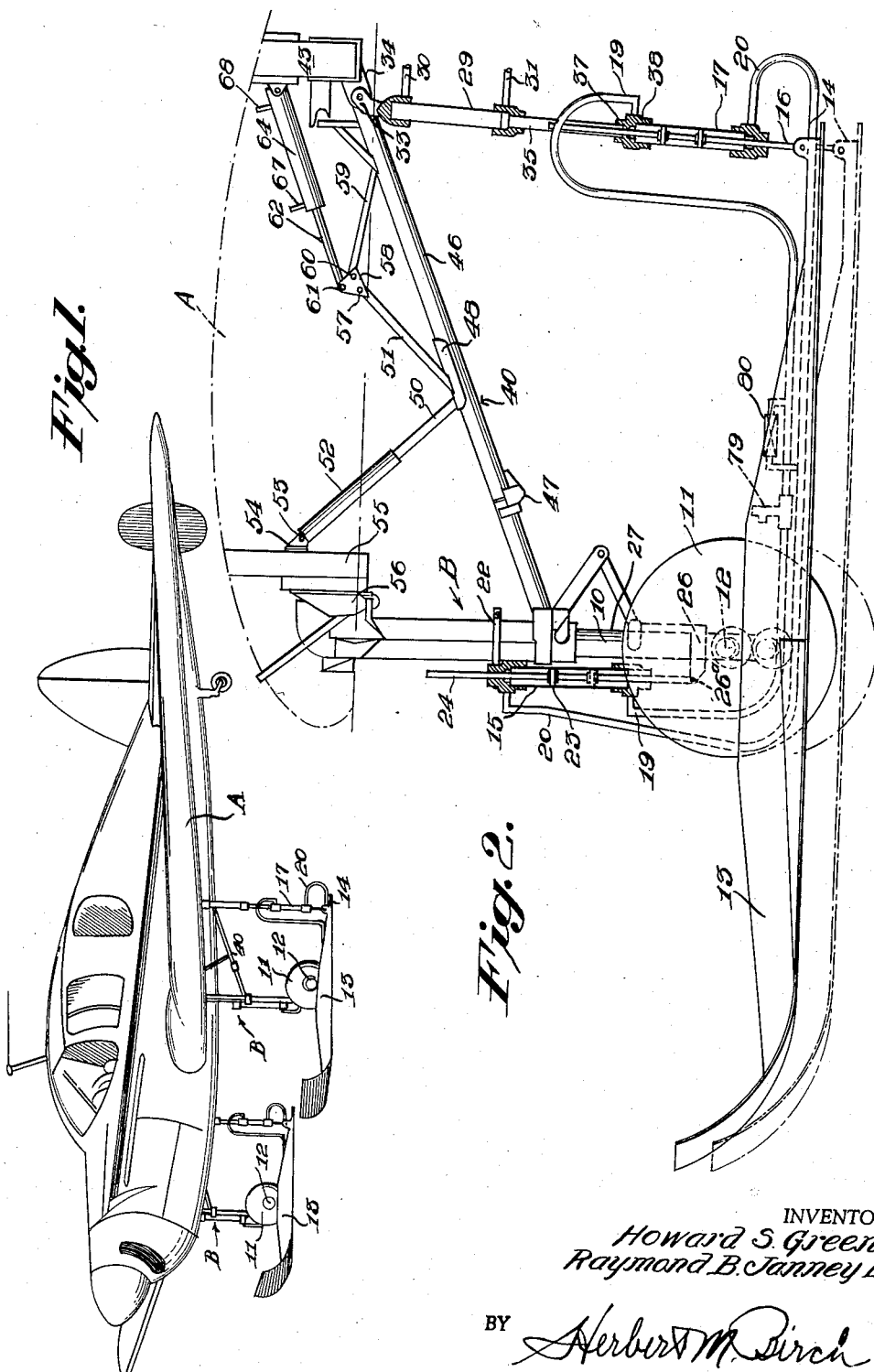
INVENTORS
Howard S. Green
Raymond B. Janney II.
BY Herbert M. Birch
ATTORNEY July 8, 1958
H. S. GREEN ET AL
2,842,325
RETRACTABLE LANDING GEAR
Filed Jan. 11, 1956
3 Sheets-Sheet 2
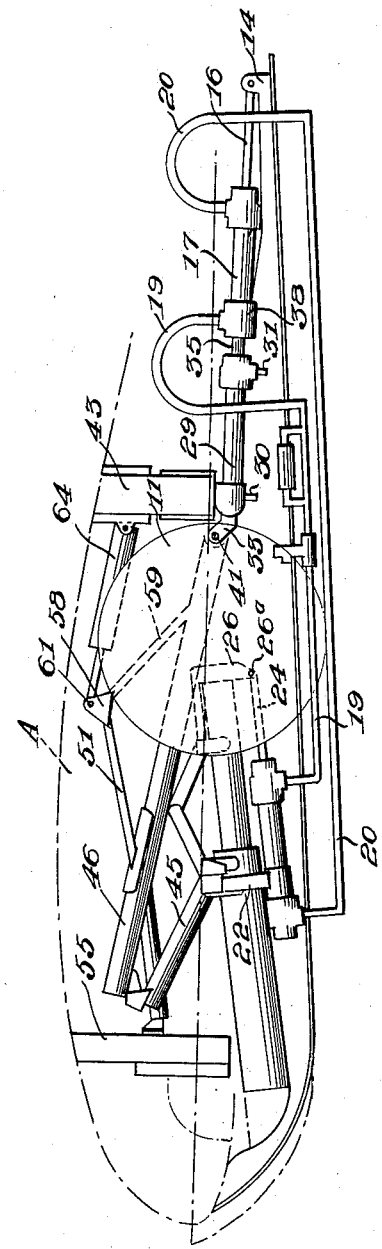
Fig. 5.
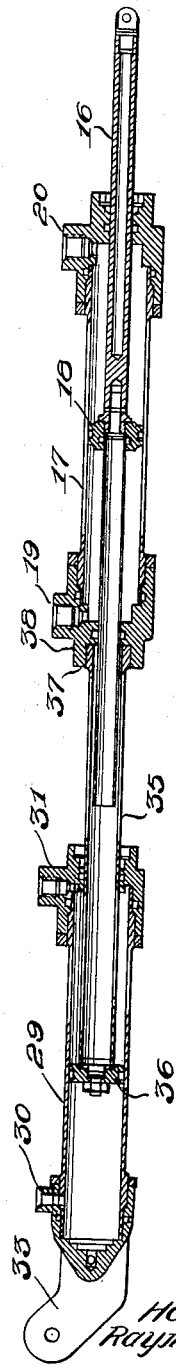
Fig. 4.
INVENTORS
Howard S. Green
Raymond B. Janney II.
BY 
ATTORNEY

United States Patent Office 2,842,325
Patented July 8, 1958

2,842,325
RETRACTABLE LANDING GEAR

Howard S. Green and Raymond B. Janney II, Wilmington, Del., assignors to All American Engineering Company, Wilmington, Del., a corporation of Delaware Application January 11, 1956, Serial No. 558,462

6 Claims. (Cl. 244—102)

The present invention relates to aircraft undercarriages and more particularly to aircraft landing gear equipped with hydro-ski means permitting safe landings on various surface mediums, as water, snow, ice, mud, grass or any combination of these mediums.

There are certain operational requirements for landing, take-off and landing gear retraction conditions encountered during use, such as control of the trim angle of the hydro-ski means to up, down or free trim operations in combination with a snug retracted non-drag producing position when in flight. For example, when landing on some mediums the ski means should be set to a fixed trim position angular with respect to the longitudinal axis of the aircraft, while when beaching from a water landing it may be desirable to provide a free trim condition. Such free trim is also required for retraction of the landing gear oleo with the ski means snugly nested under the airfoil after take-off into the air.

The various trim positions of the hydro-ski means may be controlled by a trim cylinder connected in a fluid system, which system is under control of pilot operated valve means, for example, such as illustrated in application Serial No. 515,595, filed June 15, 1955, and owned by the present assignee.

In landing on a surface medium with a set trim position, it is desirable to maintain parallelism of the set trim position selected for any trim angle with respect to said surface medium and that the ski means may be caused to temporarily assume any position imparted thereto by the landing gear oleo vertical movement without change in the trim angle of the ski planing surface.

Heretofore such parallelism of the ski planing surfaces will vary slightly when landing and taxiing on a surface medium, because of the fact that the ski means is pivoted intermediate each end on the vertically movable wheel axle of a conventional landing gear oleo shock strut. This landing gear strut when subjected to variable impacts will reciprocate vertically even though the trim cylinder is set in a fixed non-reciprocating trim position. Therefore, it is desirable that any reciprocating movement of the oleo shock strut which causes variations in trim setting be compensated for to prevent such trim variation and it is an object of this invention to provide novel means, whereby parallelism of the planing surface to the trimmed position is maintained at any trim angle regardless of the conventional landing gear oleo movement.

A further object is to provide in combination a ski or skis pivotally mounted on the axle of a retractable landing gear oleo having trim angle controlling means with a master slave system responsive to the movement of the oleo landing gear, to thereby keep the planing surface of the ski or skis parallel to the position to which they are trimmed by the trim controlling means when the landing gear oleo is extended or compressed in non-retracted position and likewise to provide means in the combination, whereby the complete assemblage may be retracted during flight.

With these and other objects in view which will become apparent as the invention is fully understood, the same resides in the novelty of construction, combination and arrangement of elements hereinafter described in detail and distinctly claimed in the appended claims.

The description should be read in conjunction with the accompanying drawings, wherein:

Figure 1 is a general perspective view of an aircraft with the landing gear extended in non-retracted position for landing, showing the master slave system in combination with the landing gear oleo and trim cylinder;

Figure 2 is a side elevational view of the landing gear of the present invention clearly illustrating the slave system, the landing gear oleo, the trim control cylinder and the landing gear retracting cylinder;

Figure 3 is a side elevational detail view of the various elements shown in Fig. 2, as they appear in their respective folded or retracted positions under the aircraft;

Figure 4 is a longitudinal section of the trim and slave cylinder means at the trailing end of the ski.

Figure 5:
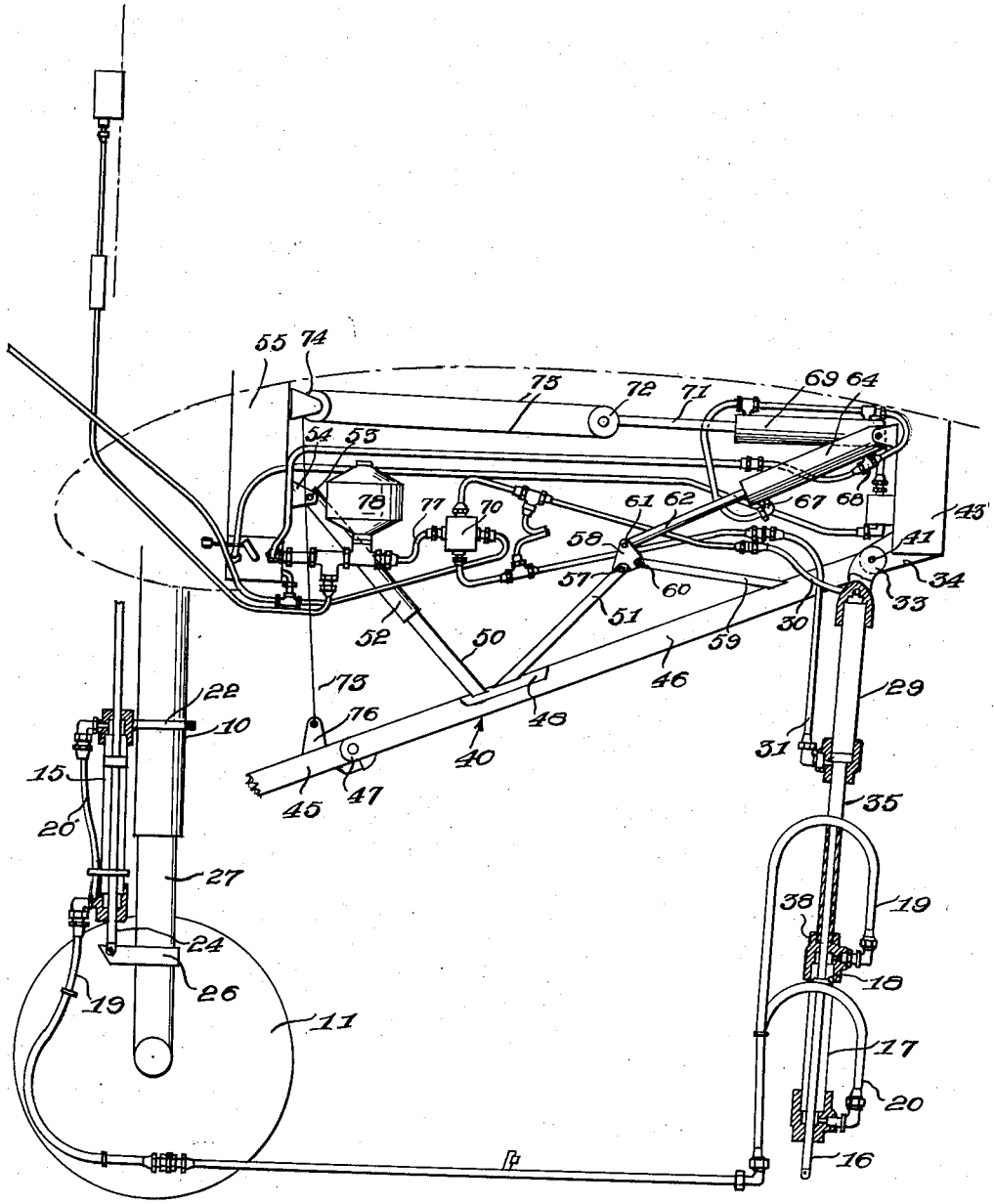
Figure 5 is a detailed side elevation showing the details of the assist cylinder and other general accessories of the device.

Referring to the drawings in detail and first with respect to the non-retracted illustrations of the present invention in Figures 1 and 2, there is an aircraft with the usual wings A having an undercarriage B. Each wing A is formed with a recess to receive a part of the undercarriage when retracted. The undercarriage B is comprised of the usual landing gear oleo 10 having a wheel 11 and an axle 12 therefor. Pivoted on the axle is a ski member, such as a hydro-ski 13. The tail end of the ski means 13 is formed with a bifurcated lug 14 to which is connected a piston shaft 16 of the slave cylinder 17.

The slave cylinder 17 is connected with the master cylinder 15 of the master slave system by interconnecting conduits 19 and 20. For example, conduit 20 cross connects to the upper end of master cylinder 15 and the bottom or lower end of slave cylinder 17, see the extended position of the landing gear in Figure 2 of the drawings, and conduit 19 cross connects from the lower end of the master cylinder 15 to the upper end of the cylinder 17. The master cylinder 15 is secured in axially parallel relation by suitable means, such as by bracket 22 to the upper part of the oleo strut 10. The master cylinder 15 contains a piston 23 having a piston rod 24 extending from the bottom of the cylinder 15 into pivotal engagement with a lug 26 by a pin 26a carried by the lower part 27 of the oleo strut 10. When the landing gear oleo is extended or compressed the master cylinder 15 is likewise extended or compressed because of the connections between the same. This action is then transmitted to the slave cylinder 17 by the interconnection of conduits 19 and 20 and the same extended or compressed length is assumed by the piston 18 on rod 16 of the slave cylinder 17. Thus, assuming a trim angle of the ski means 13 has been set, each oleo gear movement and duplicate master slave system movement of the respective cylinders 15 and 17 will keep the position of the planing surface of the ski means 13 in parallelism with the set trim angle position.

The trim cylinder 29 is actuated by pressure in the trim up pressure line 30 or by the pressure in the trim down pressure line 31. The trim cylinder 29 is pivoted by lug 33 to a bracket 34 of the undercarriage B and from its opposite end the hollow piston rod 35 from trim piston 36 extends into a threaded socket 37 in the head or cap 38 of the slave cylinder 17, see Figure 4. Accordingly, when the trim piston rod 35 is extended, the connection to the tail end of the ski means 13 through the slave cylinder 17 moves the ski planing surface to an up trim position or when the trim piston rod 35 is retracted to provide a down trim actuation.

When trim is set by the trim control system the master slave system may act in reverse, that is, the slave cylinder 17 controls the master cylinder 15. This occurs, for example, during water landings where the impact is at the aft portion of the planing surface of the ski means 13. Such impact on the aft portion will compress the slave cylinder 17 so that it acts as the master cylinder to transmit its compressed length and movement in duplicate to the master cylinder 15. Thus this motion of the slave cylinder 17 is transmitted through the master cylinder 15 to shorten the landing gear B, and is therefore of equal magnitude with the forces imparted to the strut B by the weight of the airplane when landing to keep the planing surfaces parallel to the position to which they are trimmed.

In combination with the trim control cylinder means and the oleo landing gear struts are retractable landing gear linkage means comprising an angularly extending drag strut 40 having an upper end swingable on a pivot means 41 in the supporting bracket 34 mounted from a transverse beam 43. The drag strut 40 is made in two parts 45 and 46 connected together end to end by a knee joint 47 arranged so that the ends of the parts 45 and 46 swing upwardly during gear folding or retracting actuation.

The part 46 of the drag strut 40 has a saddle plate 48 welded thereto with diverging brace arms 50 and 51 extending therefrom. The arm 50 telescopically fits within the bore of an elongated tubular element 52, which pivots on a pin 53 in a lug 54 mounted on a transverse truss beam 55. This beam 55 also pivotally supports on its opposite side the pivot bracket 56 of the landing gear oleo strut 10 for each side of the aircraft. The arm 51 is welded at its free end by a weld 57 in one point of a triangular plate 58 together with another angular brace arm 59 carried by part 46, which arm is welded in a second point of the triangular plate by weld 60. The third and upper point of the triangle plate 58 is connected by a pivot pin 61 to the extended end of a piston shaft 62, which carries a piston 63 in a landing gear retraction cylinder 64 pivotally coupled by a pin 65 in a bifurcated lug or bracket 66 supported on cross truss beam 43.

The cylinder 64 is coupled from each respective end to pressure lines 67 and 68 from a source of fluid supply through a valve arrangement 70, see Fig. 5. For example, line 67 connects to the gear up pressure line and the line 68 connects to the gear down pressure. Also, operated in co-active relation with the landing gear cylinder 64 is an assist cylinder 69 having a piston rod 71 with a sheave 72 on the extended end thereof. A cable 73 is reeved around the same and a second sheave 74 on the cross truss 55 so that the cable leads off to connect through the eyelet of a lug 76 formed from section 45 in the drag strut 40 adjacent the knee joint 47. Thus when retracting the landing gear 10 the landing gear cylinder 64 pulls the floating triangular plate 58 upward with the drag link part 46, while the assist cylinder 69 through cable 73 pulls upward on part 45 by lug 76, to thereby break the knee joint 47 for a smoother retraction performance.

The valve 70 connects by a conduit 77 to an accumulator 78 for maintaining a constant pressure in the assist and retract cylinder pressure lines.

The fluid system between the master cylinder 15 and the slave cylinder 17 shown in Figure 2 is a closed system and is independent of the trim or the retracting fluid systems. This closed system includes a thermal expansion relief valve 79 and an interflow shut-off valve 80. The valve 80 permits periodic equalizing of the master slave cylinder and piston rod extension in case of leakage.

Thus there is provided in a co-related unitary combination, a retractable landing gear with a master slave system and a trim control system for skis with planing surfaces for various surface mediums, including grass, mud, water or snow, which gear is compact when retracted in and under the airfoil and highly efficient in action when extended from the airfoil for use at a selected trim angle or free trim conditions.

While only one specific embodiment of the invention is hereinbefore set forth, it is to be expressly understood that the same is not to be limited to the details or construction and arrangement of parts as illustrated and described because various modifications may be developed in putting the invention into practice within the scope of the appended claims.

What is claimed is:

1. In combination with an oleo landing gear including a fixed upper section and a lower axially movable section, ski means pivotally mounted intermediate its ends on said movable section, means for maintaining said ski means at a set trim angle comprising a master fluid cylinder connected to said fixed oleo section and a piston in said slave cylinder having a piston rod connected to said oleo movable section, a slave cylinder having a piston therein and a rod pivotally connected to said ski means adjacent the trailing end thereof, cross fluid connections between said cylinders, a trim cylinder having a piston therein and a rod connected to said slave cylinder, and means for varying fluid pressure in said last cylinder on opposite sides of said last piston, for varying said trim angle.

2. The combination defined in claim 1, together with pivoted linkage means connected to said oleo landing gear and with an aircraft carrying same and fluid operated means connected to said linkage means for swinging said landing gear together with said master cylinder, slave cylinder and trim cylinder to a retracted position under said aircraft.

3. The combination defined in claim 2, wherein said linkage is connected to an underportion of said aircraft so as to pivot rearwardly thereof into retracted position.

4. In combination with an oleo landing gear of an aircraft including an upper fixed section and a lower telescopic section, elongated ski means pivotally mounted intermediate its ends on said telescopic section and means for controlling and setting the trim angle of said ski means, the means for controlling said trim angle comprising a master cylinder secured to said fixed oleo section having a piston therein and a piston rod connected to said telescopic oleo section, and a slave cylinder having a piston therein and a piston rod pivotally connected to the trailing end of said ski means, said master and slave cylinders being connected by conduits in a closed fluid system, said conduits each having their opposite ends disposed on opposite sides of the pistons in said master and slave cylinders whereby said ski means is uniformly displaced upon relative axial movement of said oleo sections, a trim setting cylinder having a piston therein and a piston rod connected to said slave cylinder, and fluid controlled conduits communicating with said trim cylinder on opposite sides of the piston therein.

5. The combination defined in claim 4 wherein said trim cylinder piston rod is tubular and is disposed coaxially of said slave cylinder piston rod which latter is telescoped in said tubular rod.

6. The combination defined in claim 2 wherein said aircraft is provided with a bracket to which said trim cylinder is pivotally connected and said linkage means comprising a drag strut having one end thereof connected to said oleo landing gear and having the other end thereof pivotally connected to said bracket.

References Cited in the file of this patent

UNITED STATES PATENTS

| | | |
|---|---|---|
| 2,077,526 | Messier | Apr. 20, 1937 |
| 2,374,146 | Waters | Apr. 17, 1945 |
| 2,429,992 | Crispell | Nov. 4, 1947 |
| 2,718,367 | Doolittle | Sept. 20, 1955 |